(12) United States Patent
Chen et al.

(10) Patent No.: US 8,125,557 B2
(45) Date of Patent: Feb. 28, 2012

(54) IMAGE EVALUATION METHOD, IMAGE CAPTURING METHOD AND DIGITAL CAMERA THEREOF FOR EVALUATING AND CAPTURING IMAGES ACCORDING TO COMPOSITION OF THE IMAGES

(75) Inventors: Wan-Yu Chen, Taipei County (TW); Chih-Hui Kuo, Hsinchu (TW); Ching-Chieh Wang, Yilan County (TW); Shang-Tzu Ju, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 433 days.

(21) Appl. No.: 12/367,546

(22) Filed: Feb. 8, 2009

(65) Prior Publication Data
US 2010/0201832 A1    Aug. 12, 2010

(51) Int. Cl.
*H04N 5/222* (2006.01)
*H04N 5/262* (2006.01)
*G06K 9/00* (2006.01)

(52) U.S. Cl. .............. 348/333.04; 348/333.11; 348/239; 382/165

(58) Field of Classification Search ............. 348/333.02, 348/333.04, 333.03, 333.11, 333.12, 239
See application file for complete search history.

(56) References Cited

U.S. PATENT DOCUMENTS
7,362,354 B2 * 4/2008 Lin ............................ 348/222.1
(Continued)

FOREIGN PATENT DOCUMENTS
CN         101163199 A    4/2008
(Continued)

OTHER PUBLICATIONS
Brief view to Pentax Optio S10.

*Primary Examiner* — John Villecco
(74) *Attorney, Agent, or Firm* — Winston Hsu; Scott Margo (57) ABSTRACT

An image evaluation method for a digital camera includes analyzing the composition of an image for obtaining a characteristic of the composition of the image, computing an ideal characteristic value, a real characteristic value, and a difference value between the ideal characteristic value and the real characteristic value, and generating a grade according to the difference value to show quality related to the composition of the image.

18 Claims, 6 Drawing Sheets

U.S. PATENT DOCUMENTS

| | | | |
|---|---|---|---|
| 7,652,695 B2 * | 1/2010 | Halpern | 348/239 |
| 7,688,379 B2 * | 3/2010 | Forman et al. | 348/356 |
| 7,920,727 B2 * | 4/2011 | Weng et al. | 382/118 |
| 7,944,483 B2 * | 5/2011 | Zhang | 348/222.1 |
| 2002/0154147 A1 | 10/2002 | Battles | |
| 2003/0112361 A1 * | 6/2003 | Cooper | 348/364 |
| 2005/0030388 A1 * | 2/2005 | Stavely et al. | 348/222.1 |
| 2006/0017820 A1 * | 1/2006 | Kim | 348/231.2 |
| 2006/0056835 A1 * | 3/2006 | Poon et al. | 396/310 |
| 2006/0258418 A1 | 11/2006 | Lin | |
| 2008/0037841 A1 | 2/2008 | Ogawa | |
| 2009/0278958 A1 * | 11/2009 | Bregman-Amitai et al. | 348/231.99 |

FOREIGN PATENT DOCUMENTS

JP    2001167253 A  *  6/2001

* cited by examiner

IMAGE EVALUATION METHOD, IMAGE CAPTURING METHOD AND DIGITAL CAMERA THEREOF FOR EVALUATING AND CAPTURING IMAGES ACCORDING TO COMPOSITION OF THE IMAGES

BACKGROUND OF THE INVENTION

The present invention relates to an image evaluation method, an image capturing method and a digital camera system thereof, and more particularly, to an image evaluation method for analyzing the composition of an image and generating a grade displayed to a photographer accordingly.

With the progress of semiconductor and image processing technologies, in recent year, digital still/video cameras have become popular and are often incorporated into portable devices, such as mobile phones and personal digital assistants. Digital cameras are developed toward higher resolution, powerful image processing capability, and user-friendly control interface. For example, a digital camera has different scene modes, such as portrait, landscape, night scene, etc., and captures a picture with a predetermined parameter setting of a chosen mode. The predetermine parameter setting is used to adjust parameters of the digital camera such as shutter speed and aperture to suit the chosen mode. Benefited from these advancements, people use digital still/video cameras more conveniently and take a photograph that meets basic image quality.

However, an image with low noise and high resolution does not intend that it is a good image if the composition of the image is bad. The image composition is a key to an interesting image, which concerns about the proportion of a main object to the entire image, relative sizes of objects, positions of the objects, and many other factors. For an ordinary photographer who is not skilled in photography, it is difficult to arrange objects in an impressive composition; at the same time, the photographer usually changes the zooming parameter and camera location at random before the image is actually captured, which is also called a "preview mode". As a result, the composition of the captured image is typically not very impressive.

SUMMARY OF THE INVENTION

It is therefore a primary objective of the claimed invention to provide an image evaluation method, an image capturing method and a digital camera thereof.

According to an embodiment of the present invention, an image evaluation method for a digital camera is disclosed. The image evaluation method comprises: analyzing the composition of an image for obtaining a characteristic of the composition of the image; computing an ideal characteristic value, a real characteristic value, and a difference value between the ideal characteristic value and the real characteristic value; and generating a grade according to the difference value to show quality related to the composition of the image.

According to an embodiment of the present invention, an image capturing method for a digital camera is disclosed. The image capturing method comprises: receiving an image; performing an image evaluation process on the image, for generating a grade related to the composition of the image; outputting the image and the grade; and capturing the image.

According to an embodiment of the present invention, a digital camera is disclosed. The digital camera comprises an image capturing unit, a display unit, and a signal processing unit. The image capturing unit is utilized for receiving an image and capturing the image. The display unit is utilized for displaying the image and a grade related to quality of the composition of the image. The signal processing unit is coupled to the image capturing unit and the display unit, and is utilized for performing an image evaluation process on the image, for generating the grade as a reference.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

There are some image composition techniques implemented in digital cameras to assist photographers taking pictures with better composition. One is showing composition guides on an LCD screen, such as thirds rule, diagonal rule or 3-by-3 grids; the photographer has to manually select guides fitting the scene to be captured. Another technique automatically detects and focuses on a face image, and applies an auto editing function after photo taking, for example, to trim the photo so that the detected face is positioned at an appropriate position with an appropriate proportion.

Figure 1:
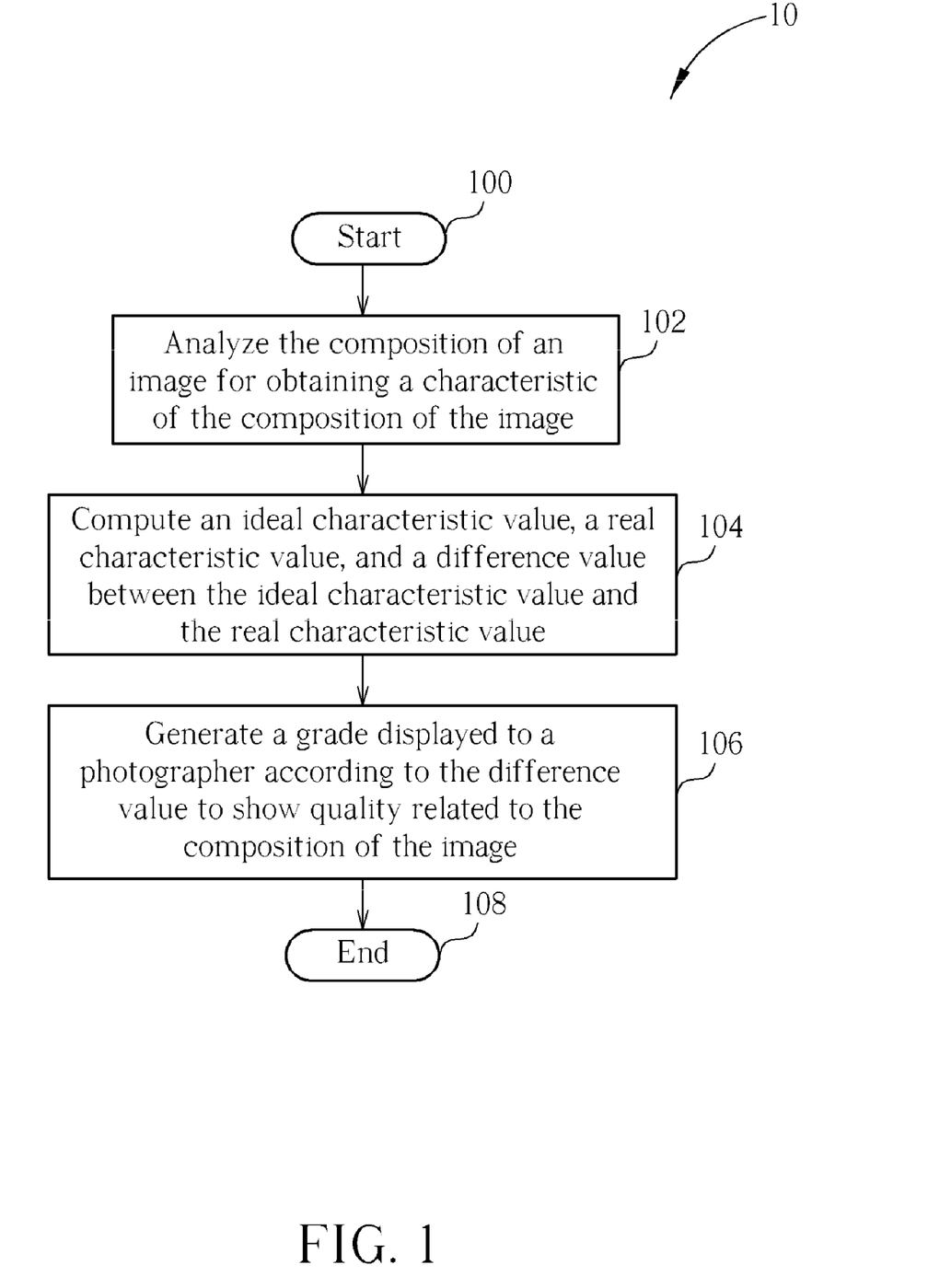
FIG. 1 is a flowchart of an image evaluation method according to an embodiment of the present invention.

Please refer to FIG. 1, which is a flowchart of an image evaluation method 10 according to an embodiment of the present invention. The image evaluation method 10 generates a grade reflecting the composition of an image. The image evaluation method 10 comprises the following steps:

Step 100: Start.

Step 102: Analyze the composition of an image for obtaining a characteristic of the composition of the image.

Step 104: Compute an ideal characteristic value, a real characteristic value, and a difference value between the ideal characteristic value and the real characteristic value.

Step 106: Generate a grade displayed to a photographer according to the difference value to show quality related to the composition of the image.

Step 108: End.

For a digital camera, the image evaluation method 10 can be performed on a preview image in a preview mode before an image is actually taken or on a captured image. First in Step 102, the image evaluation method 10 analyzes an image to locate components in the image, such as grass, sky, ocean, and/or objects in the image, such as human being, animal, so as to obtain a characteristic of the composition of the image. The characteristic of the composition depends on the components and/or objects in the image, which reflects a major consideration when composing the image. For example, if the image is a scenery image mainly composed of grass and sky, the characteristic of the composition may be the proportion of grass to sky, which makes the horizon in the image. If the image illustrates a rabbit in the grass, the characteristic of the composition of the image may be the position of the main object, the rabbit. Please note that, the quantity of the obtained characteristics of the composition is not limited in the embodiment of the present invention; for example, if there are two persons in the scenery image exampled previously, the image evaluation method 10 obtains one more characteristic, such as the scale.

Next, in Step 104, the image evaluation method 10 computes an ideal characteristic value of the obtained characteristic corresponding to the best composition for the image, a real characteristic value of the obtained characteristic corresponding to current composition, and a difference value between the ideal characteristic value and the real characteristic value. A smaller difference value indicates a better composition. In Step 106, the image evaluation method 10 generates a grade according to the difference value. The grade relates to the composition of the image and is displayed either during the preview mode or after an image is captured, so the photographer has knowledge on whether the image is worth capturing during the preview mode or whether the image needs to be recaptured if the grade is given after capture. For example, the grade is displayed on an LCD screen of the digital camera and is inversely proportional to the difference value between the ideal and the real characteristic values.

If the image evaluation method is activated in the preview mode, the photographer can try various compositions by zoom in or zoom out, or by moving the camera up, down, left, or right, or the photographer can even move to some other positions. The instant grade helps the photographer to take photos with better composition.

If the image evaluation method is performed after a picture is captured, the grade can be stored along with the picture. The grade is an indication for the photographer to determine if he/she needs to take another picture. The grade can be used for photo management, for example, sorting pictures according to the grade, so those with lower grade can be deleted first, especially when there are only a few memory spaces left.

Figure 2:
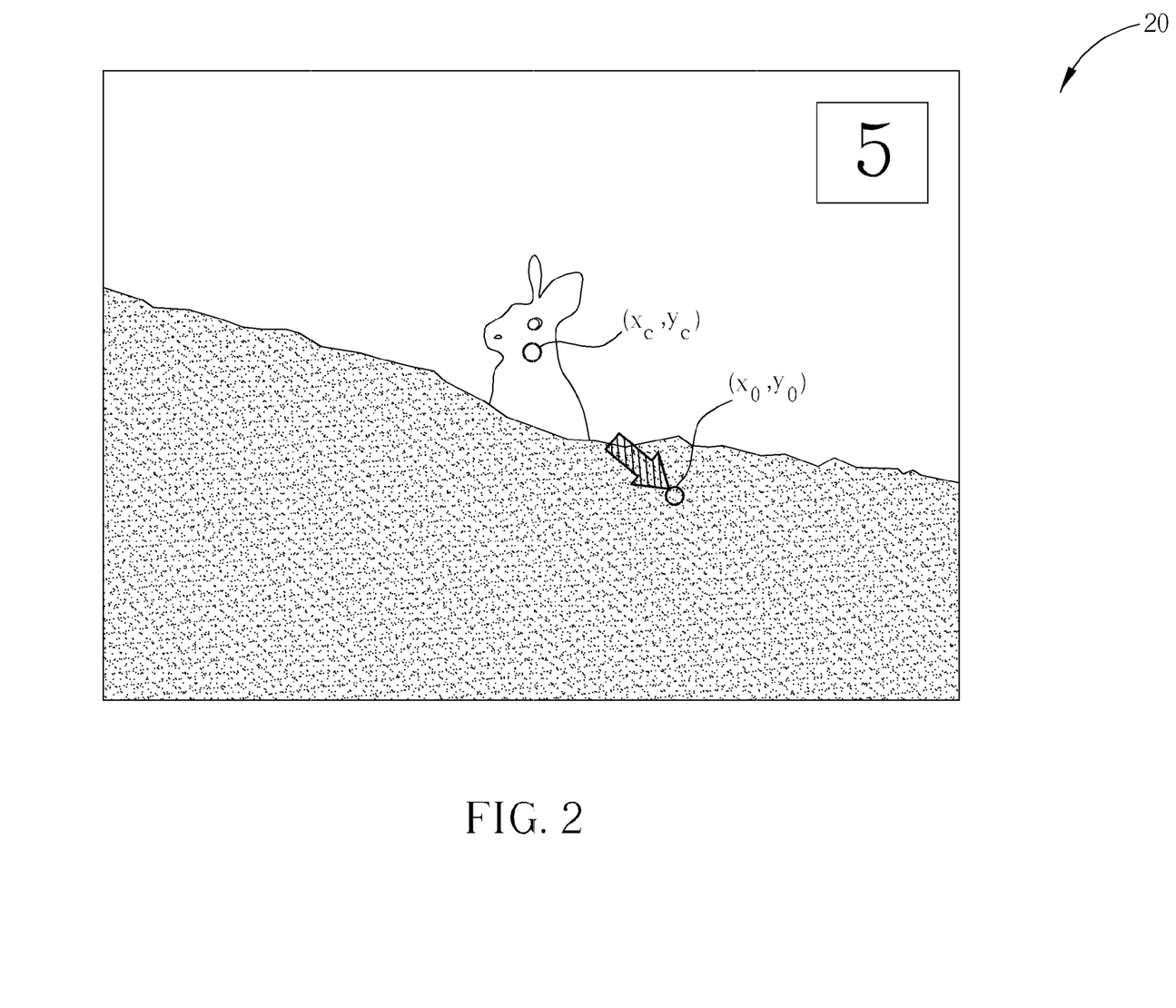
FIG. 2 and FIG. 3 show some examples illustrating the image evaluation method.
Figure 3:
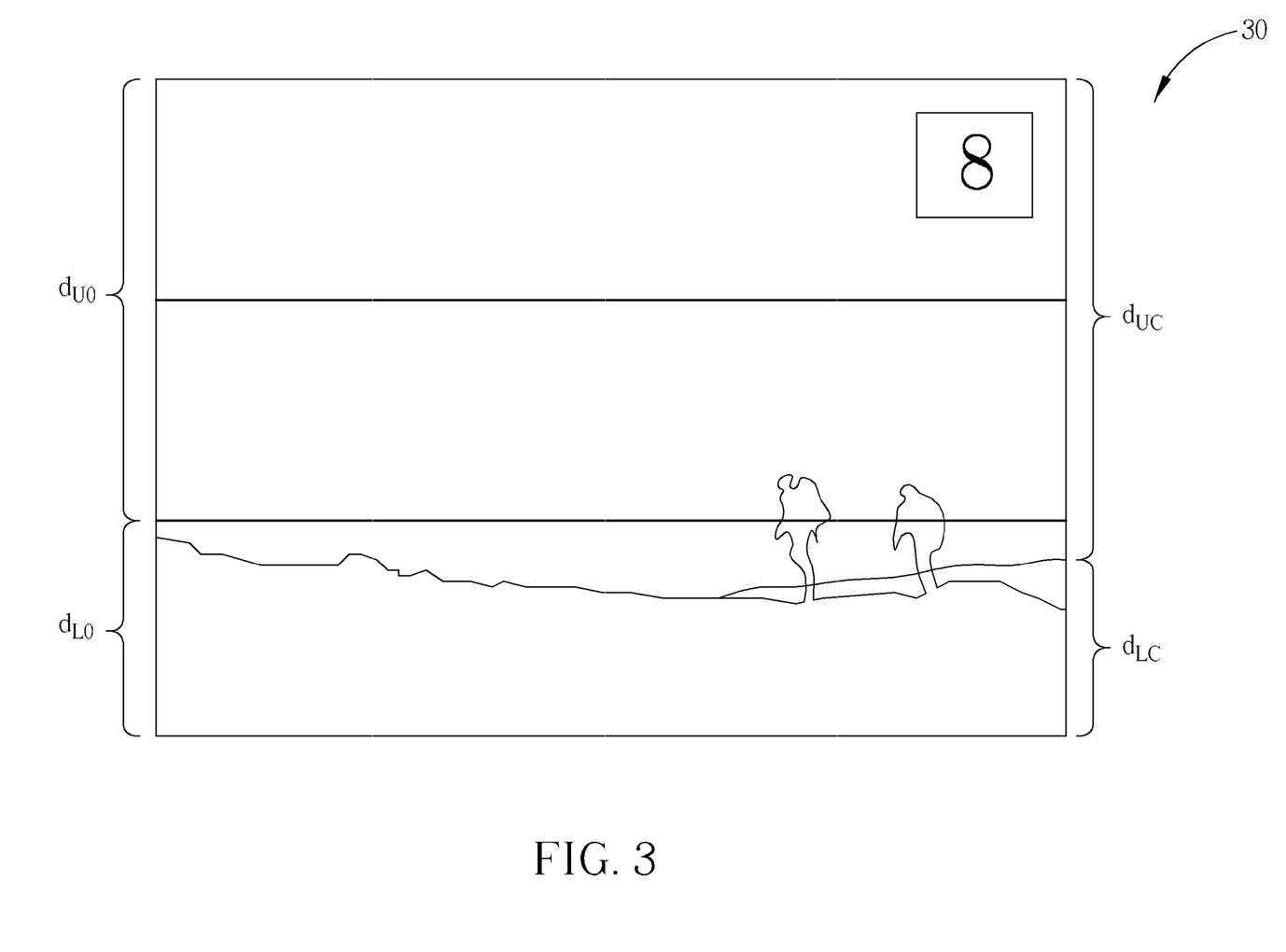

Please refer to FIG. 2 and FIG. 3, which illustrate an image 20 and an image 30 displayed on an LCD of a digital camera. As shown in FIG. 2, the composition of a rabbit positioning in the middle of the grass is a little dull. The image evaluation method 10 first analyzes the image 20 and obtains that the characteristic of the composition is the position of the main object, which is a rabbit, and computes the ideal position of the rabbit $(x_0, y_0)$, the real position of the rabbit $(x_c, x_c)$, and the difference value equal to $\sqrt{(x_c-x_0)^2+(y_c-y_0)^2}$. The image evaluation method 10 generates a grade reflecting the difference value, for example, a grade "5" relative to the highest "10", and displays the grade with the image 20 on the screen. The photographer may wish to change the composition of the image 20 by moving the digital camera or changing the zooming parameter.

As shown in FIG. 3, the image evaluation method 10 analyzes the image 30 and obtains that the characteristic of the composition of the image 30 is the proportion of main components, which are the mountain and the sky, and computes the ideal proportion of a distance $d_{U0}$ of the upper component to a distance $d_{L0}$ of the lower component, the real proportion of a distance $d_{UC}$ of the upper component to a distance $d_{LC}$ of the lower component, and the difference value equal to $(d_{UC}/d_{LC}-d_{U0}/d_{L0})$. An exemplary ideal proportion of $d_{U0}$ to $d_{L0}$ is 2/1. The image evaluation method 10 generates a relatively high grade according to the difference value of the image 30. For example, a grade "8" is displayed with the image 30 so that the photographer knows that the composition is considerably good.

The image evaluation method 10 can be used in the digital camera in several ways. Please refer to FIG. 4, which is a block diagram of a digital camera 40 according to an embodiment of the present invention. The digital camera 40 comprises an image capturing unit 400, a signal processing unit 402, and a display unit 404. The image capturing unit 400 is composed of lens, color filters and image sensors, which are well-known by those skilled in the art and are not given in detail. The image capturing unit 400 is utilized for continuously receiving preview images in a preview mode before an image is actually captured and capturing the image.

Figure 4:
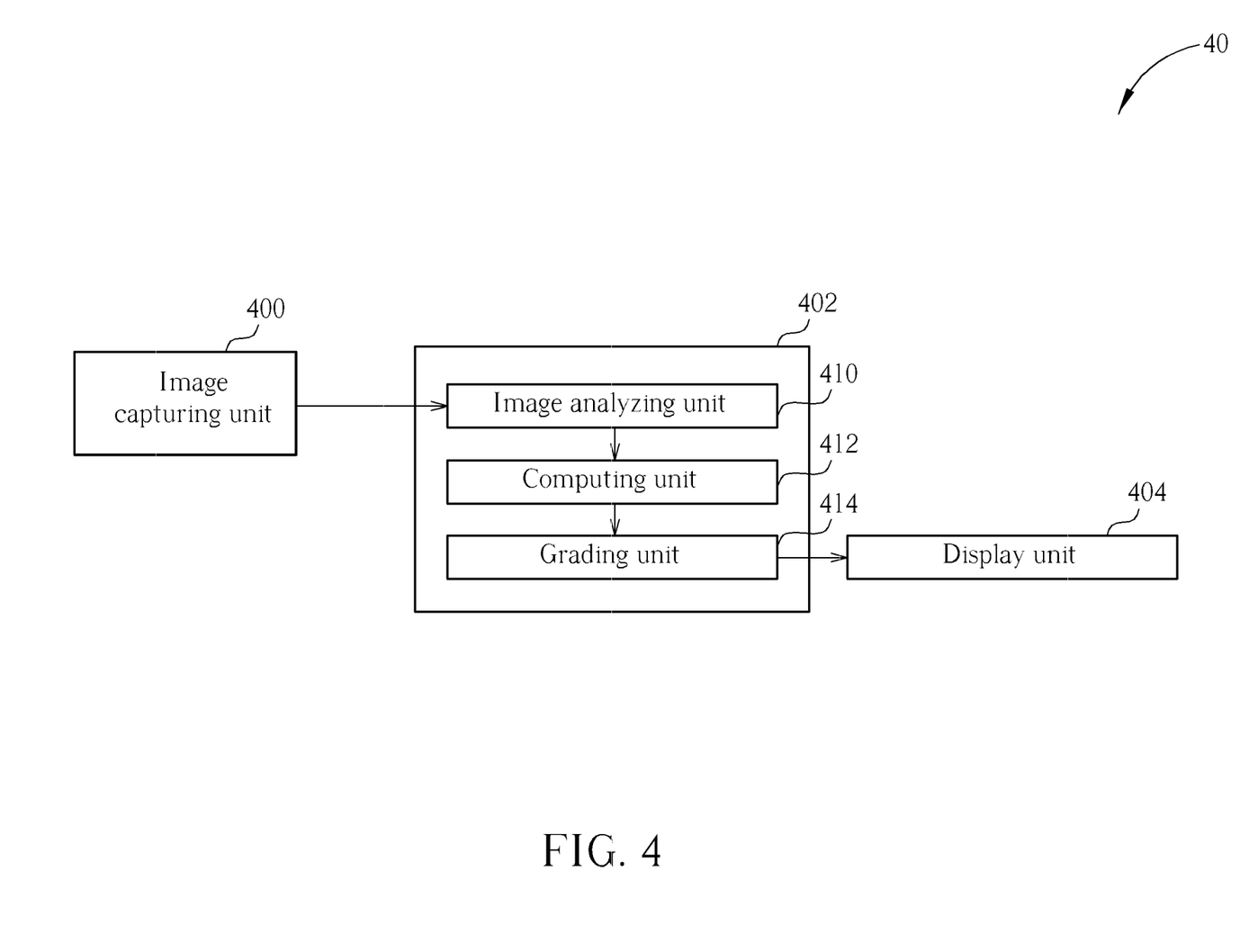
FIG. 4 is a block diagram of a digital camera according to an embodiment of the present invention.

The signal processing unit 402 comprises an image analyzing unit 410, a computing unit 412 and a grading unit 414, and is utilized for performing an image evaluation process of the image evaluation method 10 on a received image, for generating a grade related to the composition of the image. The image analyzing unit 410 is coupled to the image capturing unit 400 and is utilized for performing Step 102, for obtaining the characteristic of the composition. The computing unit 412 is coupled to the image analyzing unit 410, and is utilized for performing Step 104. The grading unit 414 is coupled to the computing unit 412 and the display unit 404, and is utilized for performing Step 106, for generating a grade displayed to a photographer according to a difference value generated by the computing unit 412. After the grade is generated, the grading unit 414 outputs the grade to the display unit 404.

Simply, the signal processing unit 402 performs the image evaluation process for evaluating the composition of the image and generating the grade related to the composition, and the photographer can get feedback from the image evaluation function on how the composition of the image is.

Figure 5:
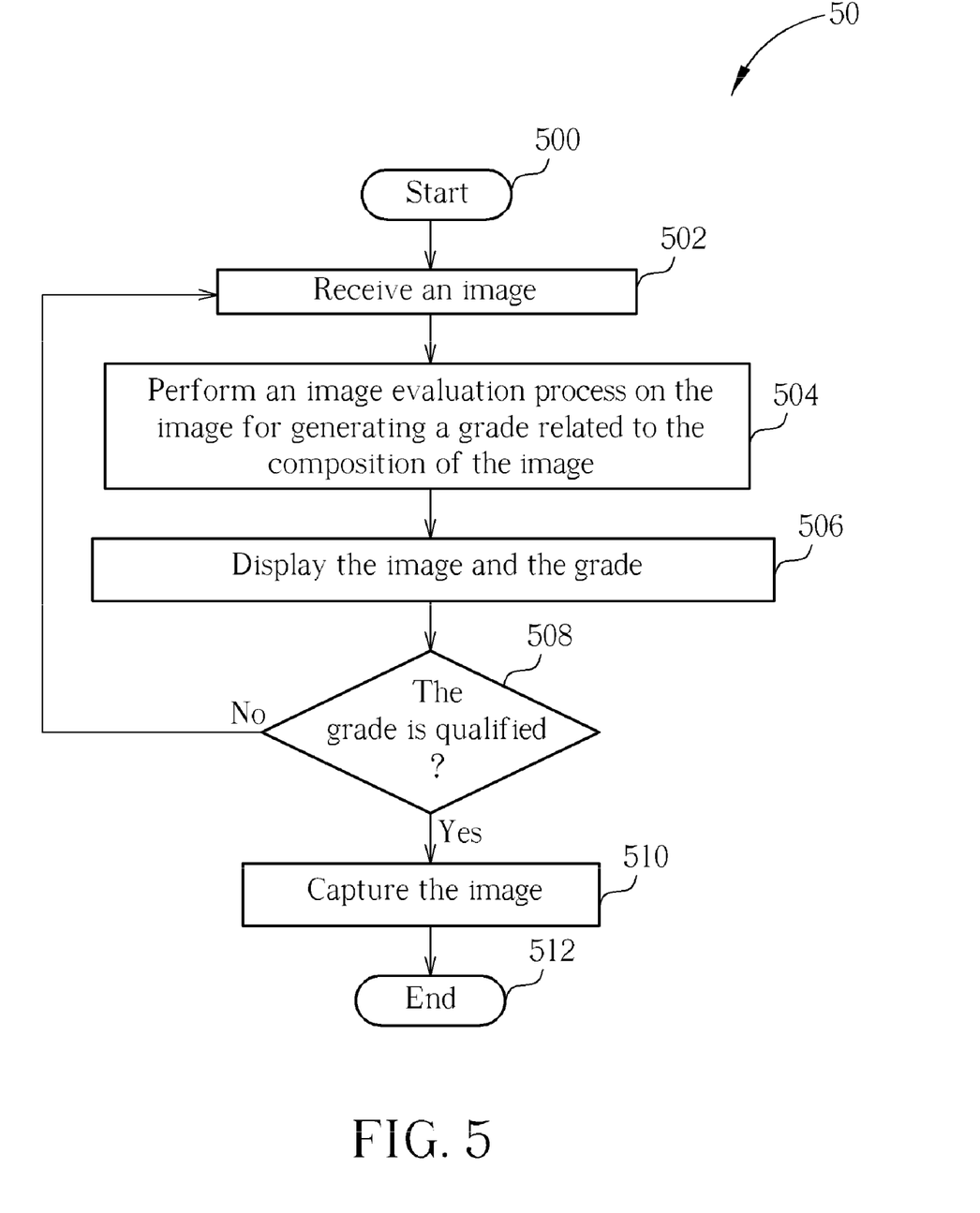
FIG. 5 is a flowchart of an image capturing method according to an embodiment of the present invention.

The present invention further provides several embodiments of image capturing methods for the digital camera 40 in FIG. 4 based on the image evaluation method 10 in FIG. 1. Please refer to FIG. 5, which is a flowchart of an image capturing method 50 according to an embodiment of the present invention. The image capturing method 50 is executed when the photographer selects an auto-capture mode, and the method comprises the following steps:

Step 500: Start.
Step 502: Receive an image.
Step 504: Perform an image evaluation process on the image for generating a grade related to the composition of the image.
Step 506: Display the image and the grade.
Step 508: Decide whether to capture the image or not according to the grade. If the grade is qualified, perform Step 510; otherwise, back to Step 502.
Step 510: Capture the image.
Step 512: End.

Before an image is actually captured, the image capturing method 50 is repeatedly performed on preview images in a preview mode. In the preview mode, the photographer may changes zoom parameters and moves the digital camera 40 to try different composition on an image subject. First, the image capturing unit 400 receives an image (which is a preview image), and the signal processing unit 402 performs the image evaluation process on the image. Note that the image evaluation process includes steps of the image evaluation method 10. The image analyzing unit 410, the computing unit 412 and the grading unit 414 in the signal processing unit 402 perform the image evaluation process to generate a grade, which is described previously. Next, the display unit 404 displays the image and the grade; and therefore, in Step 508, whether the image is captured is decided according to the grade.

Please note that, the image capturing method 50 illustrates both manual shooting and automatic shooting, and there are a little difference for performing Step 508. As to the manual shooting, Step 508 intends that the photographer manually decides whether to capture the image or not after the photographer recognizes the grade. If the grade is qualified, which means that the photographer is satisfied with the grade, the photographer may manually push the shutter-release button to control the image capturing unit 400 to capture the image. If the photographer is not satisfied with the grade, the photographer may change zoom parameters or/and move the digital camera, and the image capturing method 50 returns to Step 502 for a next preview image.

As to the automatic shooting, the photographer sets the digital camera 40 to a specific mode to perform the automatic shooting. When the photographer pushes the shutter-release button, the image capturing method 50 is initiated. According to Step 508, the digital camera 40 automatically decides whether to capture the image or not depends on a result of comparing the grade and a predetermined threshold corresponding to an acceptable composition. If the grade is qualified, which means that the grade is higher than or equal to the threshold, the image capturing unit 400 automatically captures the image; otherwise, the image capturing unit 400 receives a next preview image, as Step 502. In a word, by the image capturing method 50, the photographer can see the grade shown on the display unit 404 and know how the composition of the preview image is valued so as to decide whether to capture the image manually, or let the digital camera 40 automatically captures the image.

From the above, the digital camera 40 uses the image evaluation method 10 to generate the grade displayed corresponding to the composition of the preview image, for capturing the image with better composition. However, there is a time interval in which the composition of the image may be changed between when the photographer sees the grade and when the image is actually captured. In another embodiment of the present invention, the digital camera 40 can also perform the image evaluation method 10 on the captured image by the image analyzing unit 410, the computing unit 412 and the grading unit 414, and generate a grade related to the composition of the captured image, which is called post-evaluation. Therefore, the display unit 404 displays the grade such that the photographer can know how good the composition of the captured image is.

Figure 6:
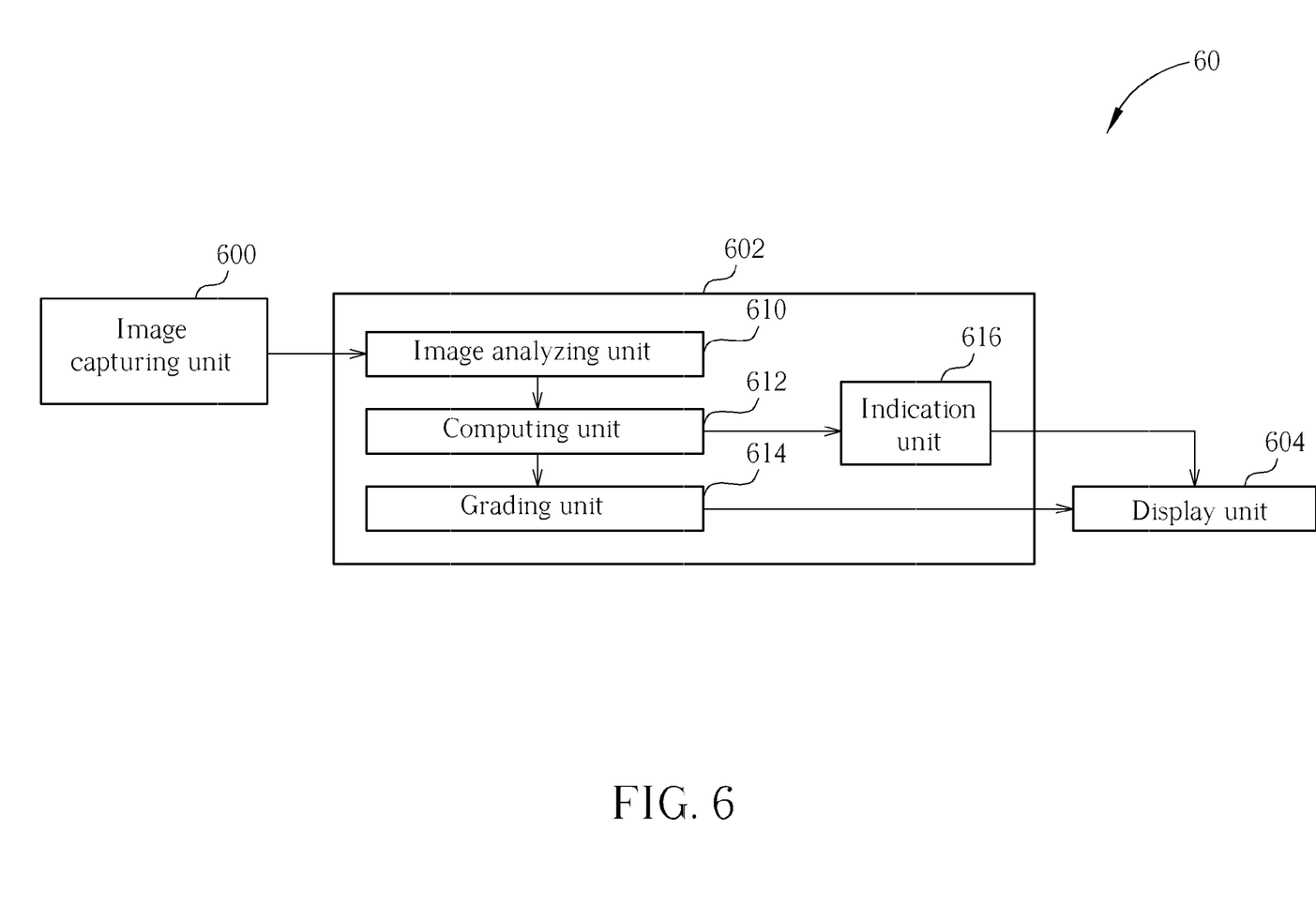
FIG. 6 is a block diagram of a digital camera according to an embodiment of the present invention.

Note that according to the image evaluation method 50, the computing unit 412 can compute the ideal characteristic value so that information of the ideal composition can also be passed to the photographer during the preview mode. Please refer to FIG. 6, which is a block diagram of a digital camera 60 according to an embodiment of the present invention. The digital camera 60 comprises an image capturing unit 600, a signal processing unit 602 and a display unit 604. The signal processing unit 602 comprises an image analyzing unit 610, a computing unit 612, a grading unit 614 and an indication unit 616. All units and related operations except the indication unit 616 are similar to those in the digital camera 40 in FIG. 4 and corresponding descriptions are not repeated. The indication unit 616 is coupled to the computing unit 612 and the display unit 604, and is utilized for generating an indication displayed on the display unit 604 according to the ideal characteristic value generated by the computing unit 612. The display unit 604 displays the indication to guide the photographer moves the camera or changes the zooming parameter toward the ideal composition. The indication may be an icon displayed on the screen suggesting the photographer to zoom in or zoom out, or to move toward a particular direction. The photographer may follow the icon to compose a picture with better composition. Take the FIG. 2 and FIG. 3 as examples. If the image 20 in FIG. 2 is a preview image of the digital camera 60, there is an arrow which is generated by the indication unit 616 for indicating the ideal position of the main object. As shown in FIG. 3, there is a guide line generated by the indication unit 616 for indicating the ideal horizon that helps to achieve the ideal proportion of the upper component to the lower component of the image.

In some embodiments, the image evaluation method only calculates and output the indication instead of the grade. Furthermore, the indication or the grade output from the signal processing unit does not need to be in a display form, for example, it can be a control signal provided to a speaker.

In conclusion, according to embodiments of the present invention, the image evaluation method generates a grade related to the composition of the image, and the image capturing method further uses the image evaluation method to evaluate the composition and decide whether to capture during preview mode or whether to recapture after a picture is captured. Therefore, a digital camera employing the image evaluation method and image capturing method assists the photographer to take photos with better composition in an easy way.

Those skilled in the art will readily observe that numerous modifications and alterations of the device and method may be made while retaining the teachings of the invention.

What is claimed is:
1. An image evaluation method for a digital camera, the image evaluation method comprising:
   performing an image evaluation process on an image received with the digital camera, the image evaluation process for the image comprising:
      analyzing the composition of an image for obtaining a characteristic of the composition of the image;
      computing an ideal characteristic value, a real characteristic value, and a difference value between the ideal characteristic value and the real characteristic value; and
      generating a grade according to the difference value to show quality related to the composition of the image;
   outputting the image and the grade;
   capturing the image;
   performing the image evaluation process on the captured image, for generating a post-evaluation grade related to quality of the composition of the captured image; and
   displaying the post-evaluation grade.
2. The image evaluation method of claim 1, wherein the characteristic of the composition is the proportion of main components in the image or a position of a main object in the image.
3. An image capturing method for a digital camera, the image capturing method comprising:
   receiving an image;

performing an image evaluation process on the image, for generating a grade related to the composition of the image;
outputting the image and the grade;
capturing the image;
performing the image evaluation process on the captured image, for generating a post-evaluation grade related to quality of the composition of the captured image; and
displaying the post-evaluation grade.

4. The image capturing method of claim 3, wherein the steps of receiving, performing image evaluation process, and outputting are repeated executed before receiving a control signal to capture the image.

5. The image capturing method of claim 3, wherein the step of capturing the image is performed when the grade is higher than or equal to a predetermined threshold by the digital camera automatically.

6. The image capturing method of claim 3, wherein the image evaluation process comprises:
analyzing the composition of the image for obtaining a characteristic of the composition of the image;
computing an ideal characteristic value, a real characteristic value, and a difference value between the ideal characteristic value and the real characteristic value; and
generating the grade according to the difference value to show quality related to the composition of the image.

7. The image capturing method of claim 6, wherein the characteristic of the composition is the proportion of main components in the image or a position of a main object in the image.

8. The image capturing method of claim 3, wherein the image evaluation process comprises:
analyzing the composition of the captured image for obtaining a characteristic of the composition of the captured image;
computing an ideal characteristic value, a real characteristic value, and a difference value between the ideal characteristic value and the real characteristic value; and
generating the post-evaluation grade according to the difference value to show quality related to the composition of the image.

9. The image capturing method of claim 3, wherein the image evaluation process is performed on the image after capturing.

10. The image capturing method of claim 3, further comprising:
generating an indication for indicating an ideal composition.

11. The image capturing method of claim 10, wherein the indication is a control signal provided to a speaker.

12. The image capturing method of claim 10, wherein the indication is a guide for a photographer to capture the image with the ideal composition.

13. A digital camera comprising:
an image capturing unit, for receiving an image;
a display unit, for displaying the image and a grade related to quality of the composition of the image; and
a signal processing unit, coupled to the image capturing unit and the display unit, for performing an image evaluation process on the image, for generating the grade related to the composition of the image as a reference, for outputting the image and the grade to the display unit, for controlling the image capturing unit to capture the image, for performing the image evaluation process on the captured image, and for generating a post-evaluation grade related to quality of the composition of the captured image;
wherein the display unit displays the post-evaluation grade.

14. The digital camera of claim 13, wherein the digital camera automatically captures the image when the grade is higher than or equal to a predetermined threshold.

15. The digital camera of claim 13, wherein the signal processing unit comprises:
an image analyzing unit, coupled to the image capturing unit, for analyzing the image, for obtaining a characteristic of the composition of the image;
a computing unit, coupled to the image analyzing unit, for computing an ideal characteristic value, a real characteristic value, and a difference value between the ideal characteristic value and the real characteristic value; and
a grading unit, coupled to the computing unit and the display unit, for generating the grade related to quality of the composition of the image according to the difference value.

16. The digital camera of claim 15, wherein the characteristic of the composition is the proportion of main components in the image or a position of a main object in the image.

17. The digital camera of claim 13, wherein the signal processing unit performs the image evaluation process on a captured image.

18. The digital camera of claim 13, wherein the signal processing unit comprises an indication unit utilized for generating an indication, for indicating an ideal composition.

* * * * *